United States Patent
Dufault

(10) Patent No.: US 11,492,087 B2
(45) Date of Patent: *Nov. 8, 2022

(54) COMBINATION PADDLE AND PUMP

(71) Applicant: Daniel Roger Dufault, Lincolnville, ME (US)

(72) Inventor: Daniel Roger Dufault, Lincolnville, ME (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/174,384

(22) Filed: Feb. 12, 2021

(65) Prior Publication Data

US 2021/0253212 A1  Aug. 19, 2021

Related U.S. Application Data

(63) Continuation-in-part of application No. 16/738,314, filed on Jan. 9, 2020, now Pat. No. 11,180,233.

(60) Provisional application No. 62/812,525, filed on Mar. 1, 2019.

(51) Int. Cl.
| | |
|---|---|
| *B63H 16/04* | (2006.01) |
| *F04B 9/14* | (2006.01) |
| *F16K 15/14* | (2006.01) |
| *B63B 34/26* | (2020.01) |
| *B63H 11/00* | (2006.01) |
| *B63H 19/00* | (2006.01) |
| *F04B 33/00* | (2006.01) |

(52) U.S. Cl.
CPC ............. *B63H 16/04* (2013.01); *B63H 11/00* (2013.01); *B63H 19/00* (2013.01); *F04B 9/14* (2013.01); *F16K 15/147* (2013.01); *B63B 34/26* (2020.02); *F04B 33/00* (2013.01); *F04B 33/005* (2013.01)

(58) Field of Classification Search
CPC ......... B63H 11/00; B63H 11/02; B63H 11/04; B63H 16/00; B63H 16/04; B63H 19/00; B63B 34/26; F04B 9/14; F04B 33/00; F04B 33/005; F16K 15/147
USPC .............................................. 440/21, 23, 101
See application file for complete search history.

(56) References Cited

U.S. PATENT DOCUMENTS

| | | | | |
|---|---|---|---|---|
| 3,044,410 | A * | 7/1962 | Edmundson | ........... B63H 16/04 416/74 |
| 3,800,734 | A * | 4/1974 | Whang | ................... B63H 16/04 440/31 |
| 5,163,778 | A * | 11/1992 | Botero | ................... B63B 13/00 114/221 R |
| 5,322,462 | A * | 6/1994 | Hull | ....................... B63H 16/04 114/221 R |
| D362,384 | S * | 9/1995 | Middlebrook | .......... B63B 13/00 D8/499 |

(Continued)

*Primary Examiner* — Daniel V Venne
(74) *Attorney, Agent, or Firm* — H. Jay Spiegel

(57) ABSTRACT

A combined paddle and pump can be used to propel a small boat. The handle telescopes with a locking nut that may be loosened to allow extension and retraction of the handle. The handle is hollow throughout and a pair of check valves are provided. One check valve opens when the handle is extended and the other opens when the handle is retracted. When one check valve is open, the other is closed. When the distal end of the paddle is placed within a volume of water or exposed to atmospheric, extension and retraction of the handle results in a fluid first being sucked into the hollow interior of the handle and then propelled out of the handle. A seal assembly prevents debris from binding tubes of the handle.

20 Claims, 10 Drawing Sheets

(56) References Cited

U.S. PATENT DOCUMENTS 6,027,386 A * 2/2000 Hains .................. B63B 13/00
 114/221 R
6,482,058 B2 * 11/2002 Sanso .................. A63B 67/007
 446/153

* cited by examiner

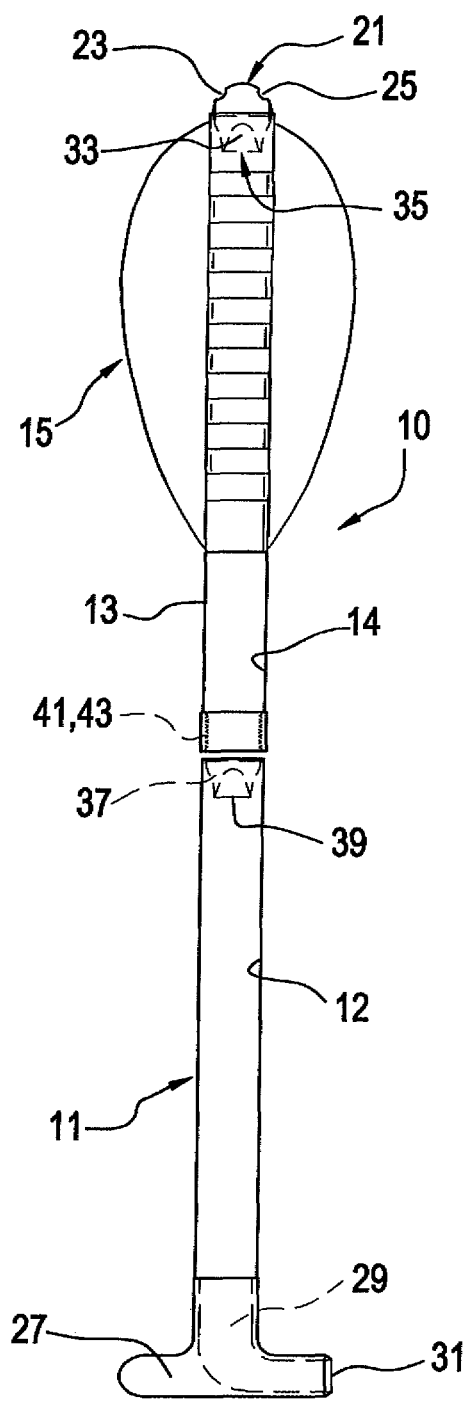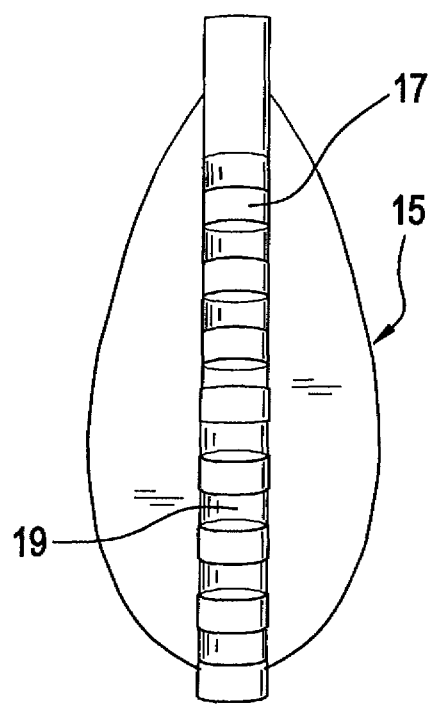

FIG. 3
FIG. 4
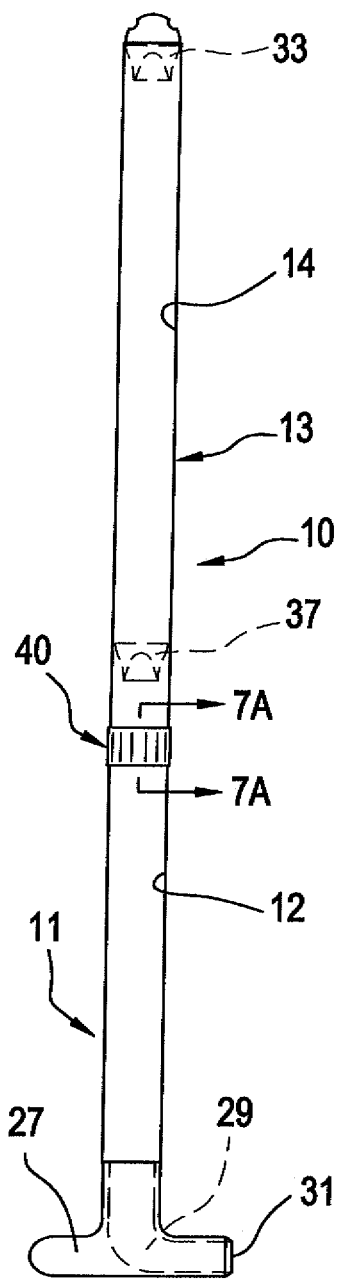
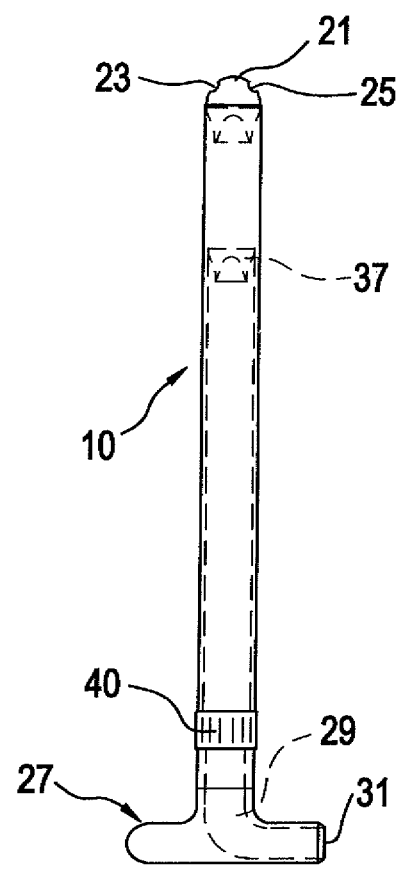
FIG. 5
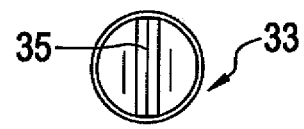
FIG. 6

77

COMBINATION PADDLE AND PUMP

This application is a Continuation-in-Part of application Ser. No. 16/738,314 filed Jan. 9, 2020. Applicant also claims priority from Provisional Application Ser. No. 62/812,525, filed Mar. 1, 2019.

BACKGROUND OF THE INVENTION

The present invention relates to an improved combination paddle and pump. It is always advantageous when multiple functions can be combined in a single device. Such inventions save space and enhance versatility of differing consumer products. In this case, paddles are often used in small vessels in order to propel such vessels. Often such vessels receive water from the body of water in which they are floating, which water needs to be pumped out. It is an intention of the present invention to combine the functions of a paddle and a pump not only to provide the functionality of both but to reduce the amount of space necessary to store both a paddle and a pump. It is also an intention of the present invention to facilitate operation of the present invention as a pump in a manner facilitating great reliability and lengthy service life.

Applicant is aware of the following U.S. Patents.

U.S. Pat. No. 5,163,778 to Botero discloses a device which combines the functions of a paddle, a hook, and a pump. In Botero, the inlet and outlet of the pump are at the very bottom of the paddle. In order to render the pump function operative, hoses must be attached to the inlet and outlet with the inlet placed in the water to be pumped and the outlet placed elsewhere. The present invention differs from the teachings of Botero as providing a completely self-contained pump in a paddle where the inlets are located at the very bottom of the paddle and the outlet for the pump is provided at the very top of the paddle in its handle.

U.S. Pat. No. 5,322,462 to Hull et al. discloses the combination of an oar and a bilge pump. In the Hull et al. device, an inlet is located at the very bottom of the oar. When the handle is extended, liquid is sucked into the conduit associated with the inlet. At that point, the oar must be lifted out of the body of water and moved away from the water so that the handle can be pushed in to expel the water that had been sucked in. By contrast, in the present invention, there is no need to remove the paddle from the water that is being pumped because that water or liquid is expelled from an outlet in the handle of the paddle.

The invention disclosed and claimed in patent application Ser. No. 16/738,314 has been commercialized. In use, Applicant has found that, eventually, grit, sand and other debris is able to bypass around the sides of the check valve attached to the first hollow tube and travel between the tubes as the first hollow tube reciprocates within the second hollow tube to eventually cause a binding effect that prevents the tubes from reciprocating with respect to one another. This issue not only precludes effective use of the invention as a pump but also prevents easy extension of the first hollow tube with respect to the second hollow tube to a combined length facilitating use as a paddle. This application is filed to disclose improvements to the invention to resolve this issue.

SUMMARY OF THE INVENTION

The present invention relates to an improved combination paddle and pump. The present invention includes the following interrelated objects, aspects and features:

(1) In a first aspect, the present invention comprises a paddle which can be used to propel a small boat. It has a widened paddle end and a handle attached to the paddle that may telescope to extend and retract its length.

(2) The handle is a telescoping handle with a nut that may be loosened to allow extension and retraction of the handle, which nut may be tightened once the length of the handle has been extended to a desired degree so that it can be used to propel a small boat.

(3) The handle is hollow throughout and terminates at its distal end with one or more openings allowing access to the hollow interior of the handle. The hollow interior of the handle extends all the way to the proximal end where a T-end is provided for gripping. The T-end also includes a side outlet fluidly connected to the hollow interior of the handle.

(4) Within the hollow interior of the handle, a pair of check valves are provided. One check valve opens when the handle is extended and the other opens when the handle is retracted. When one check valve is open, the other is closed.

(5) When the distal end of the paddle is placed within a volume of water with the distal end inlet to the hollow interior of the handle submerged within the water or other liquid, extension and retraction of the proximal end of the handle in a stroking procedure results in a liquid first being sucked into the hollow interior of the handle and then propelled out the side outlet of the T-end. Applicant has found that the present invention as improved may also be used to pump air from the atmosphere into an enclosed object such as a pool float, balloon or vehicle tire. In fact, Applicant has found that the inventive pump may be used to inflate an object to a pressure of up to 50 psi or more.

(6) In this way, the paddle may be used as a pump to pump liquid from any volume of liquid such as on the floor of a small boat or in any other environment where it is desired to pump liquid from one place to another, or as an air pump as described above.

(7) The present invention does not require attachment of any auxiliary hoses to the inlet, to the handle, or the outlet therefrom. Of course, if it is desired, hoses may be so attached but, again, they are unnecessary.

As such, it is a first object of the present invention to provide an improved combination paddle and pump.

It is a further object of the present invention to provide such a device in which a paddle has a telescoping handle and may be used to propel a small vessel such as a canoe, rowboat or paddle board.

It is a yet further object of the present invention to provide such a device in which the telescoping handle has a hollow interior in which opposed check valves are installed.

It is a yet further object of the present invention to provide such a device in which the hollow interior of the handle and the opposed check valves combine together to allow liquid or air to be pumped from the distal end of the paddle to the proximal handle and out a side outlet in the handle.

It is a yet further object of the present invention to provide such a device in which a seal assembly is provided to preclude sand, grit or other debris from bypassing the check valve on the first hollow tube where it could bind up the tubes and prevent them from telescoping.

It is a still further object of the present invention to provide such a device in which the length of the handle may be adjusted and locked in place for ease of paddling.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a side exploded view of the present invention.

FIG. 2 shows a side view of the paddle of the present invention.

FIG. 3 shows a side view of the telescoping shafts of the present invention in an extended configuration.

FIG. 4 shows the shafts of the present invention in a compressed or retracted configuration.

FIG. 5 shows a top view of a duckbill check valve used in the present invention.

FIG. 6 shows a side view of the check valve of FIG. 5.

SPECIFIC DESCRIPTION OF THE PREFERRED EMBODIMENTS

Figure 7A:
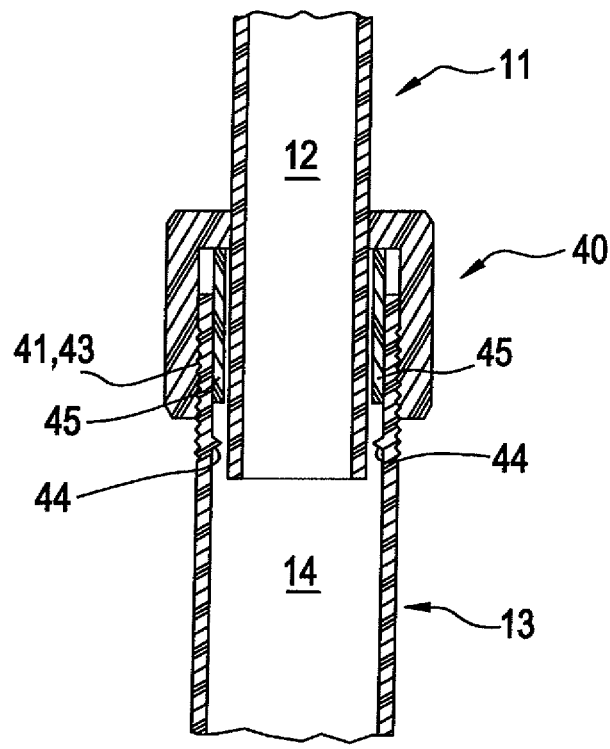
FIG. 7A shows a cross-sectional view along the line 7A-7A of FIG. 3.
Figure 7B:
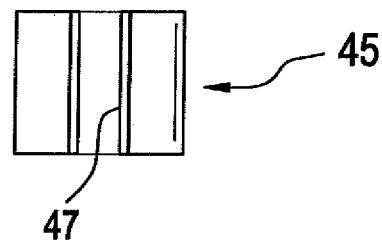
FIG. 7B shows the split ring.
Figure 8:
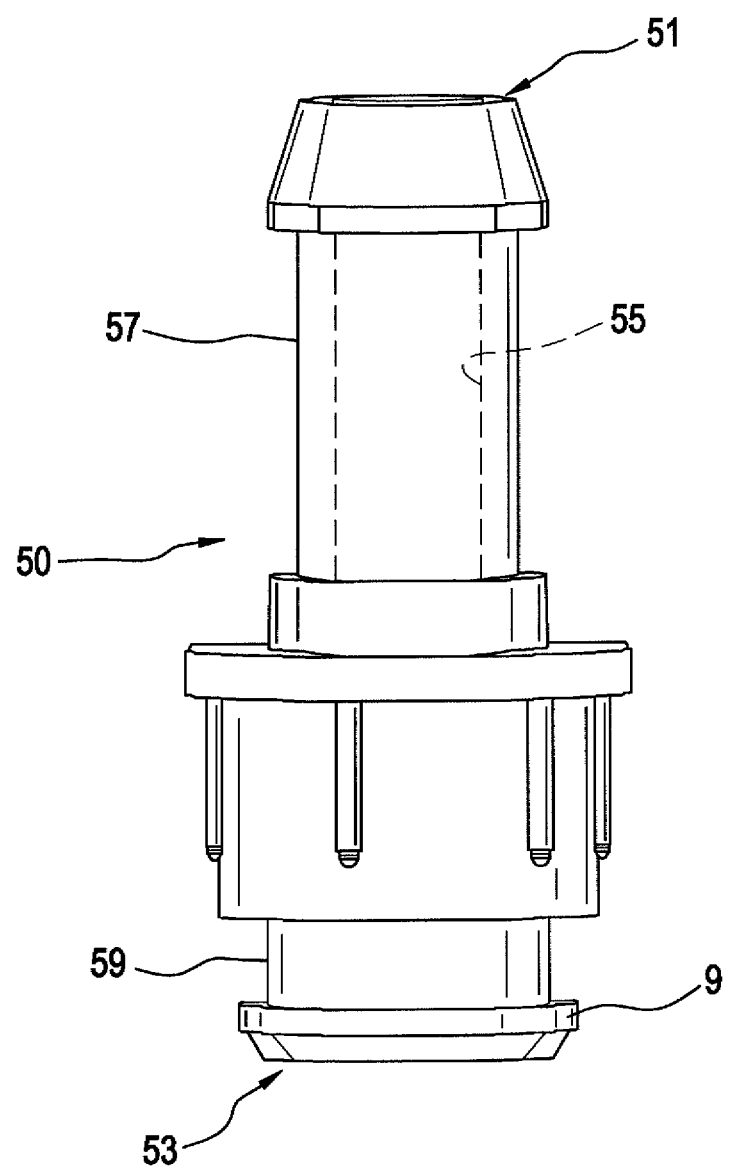
FIG. 8 shows a housing in a second embodiment of the present invention designed to hold a seal assembly and a check valve on the first hollow tube.

FIGS. 1-7B show a first embodiment of the present invention. Reference is first made to FIGS. 1-4. As seen, in the first embodiment, the present invention is generally designated by the reference numeral 10 and is seen to include a first hollow tube 11 having a passageway 12 therethrough and a second hollow tube 13 having a passageway 14 therethrough. The outer diameter of the tube 11 is substantially the same as the inner diameter of the tube 13, in other words, the outer diameter of the passageway 14 so that the tube 11 may telescope within the tube 13. Of course this may be reversed, with the tube 13 telescoping within the tube 11.

As best seen in FIG. 1, at the distal end of the tube 11, a check valve 37 is provided that includes a slot 39. The check valve 37 is known in the art as a duckbill check valve. Similarly, at the distal end of the tube 13, a duckbill check valve 33 is provided which includes a slot 35. With reference to FIGS. 5 and 6, the duckbill check valve 35 is shown including the elongated slot 39 which allows flow in the direction of the arrow A (FIG. 6) but closes when flow of fluid is in the opposite direction. The same structure and operation is true of the check valve 37. Preferably, the check valve 33 is positioned sufficiently far into the tube 13 that the tube 11 does not contact the check valve 33 during operation of the device 10 as a pump. In the preferred embodiment, the check valve 33 is installed close enough to the inlets 23 and 25 to preclude such contact. However, if desired, the check valve 33 can be installed anywhere along the passageway 14 within the tube 13. For example, in some instances, the check valve 33 may be placed a few inches above the distal end of the paddle 15 to allow the tube 13 to taper so that the tube 13 is contoured to the shape of the paddle 15 and, in that instance, the passageway 14 becomes more oblong in shape.

The tube 11 has a proximal T-shaped handle 27 with a passageway 29 fluidly connected to passageway 12 that culminates in an exit port 31. This is seen in FIGS. 1 and 3.

With reference to FIGS. 1 and 2, a paddle 15 is attached to the tube 13. As shown in FIG. 2, a plurality of rings 17 are integrally formed with the paddle 15. Each ring has an opening therethrough 19 which allows the tube 13 to be slid through the aligned openings 19. Thereafter, the tube 13 is fixedly attached to the paddle 15 in a manner well known to those of ordinary skill in the art, such as, for example, by one or more rivets, screws, or other fasteners.

As seen in particular from comparison of FIGS. 3 and 4, the tube 11 may telescope within the tube 13. This telescoping action can occur to the extremes shown in FIGS. 3 and 4, respectively. The end of the tube 13 includes a fitting 21 that has inlets 23 and 25 (FIGS. 1 and 4) that fluidly connect with the passageway 14 within the tube 13 via the check valve 33.

Thus, when the inventive device 10 is in the orientation shown in FIG. 4, and the handle 27 is gripped and the tube 11 is pulled out toward the configuration shown in FIG. 3, the check valve 37 closes and the check valve 33 opens to allow fluid to flow into inlets 23 and 25, to flow past the open check valve 33 and into the chamber formed by the passageway 14. When, thereafter, the handle 27 is gripped and pushed inward to restore the orientation of the inventive device 10 to the configuration shown in FIG. 4, the check valve 33 closes and the check valve 37 opens to allow fluid to travel from the chamber formed by the passageway 14 into the chamber formed by the passageway 12. Successive movements of the tube 11 in and out with respect to the tube 13 cause the fluid to continue to ascend the passageway 12 toward the outlet 31, whereupon the fluid begins to exit the outlet 31.

A nut 40 is provided as shown in FIGS. 1, 3 and 7A in particular, and which is mounted on the tube 13. The nut includes internal threads 43 that enmesh with external threads 41 on the exterior of the proximal end of the tube 13. A split ring 45 including a split 47 is carried within the nut 40 (see FIGS. 7A and 7B) and when the nut 40 is threaded toward a tightened configuration, the split ring 45 hits the annulus 44 and this causes the ring 45 to contract and the split 47 to narrow to tighten the ring 45 about the tube 11 to lock the telescoped position of the tube 11 with respect to the tube 13. In that configuration, particularly with the tube 11 extended with respect to the tube 13 as shown in FIG. 4, the inventive device 10 may be used as a paddle. Of course, the device 10 may be used as a paddle in any telescoped position of the tube 11 with respect to the tube 13. When it is desired to use the inventive device as a pump, the nut 40 must be loosened to allow free reciprocation of the tube 11 within the tube 13 to allow fluid to be pumped from the inlets 23, 25 and through the passageways 14 and 12 and out the outlet 31. The nut 40 operates as a threaded compression fitting that secures the telescoped relationship between the tubes 11 and 13 at a desired length. When the tube 11 is inserted as far as it can go into the tube 13, the device 10 may easily be stored. The nut or compression fitting 40 is released, as explained herein, to allow the device 10 to be used as a pump. The nut 40 may be replaced with any device that enables selective locking of the telescoped position of the tube 11 with respect to the tube 13, and release to allow free telescoping. Examples of alternative devices include clutch locks, split collar locks, snap locks, set knobs, cam locks, and others.

In this way, the inventive device 10 may be used in one configuration as a paddle and in another configuration as a pump. Thus, it becomes unnecessary to provide a separate pump to pump liquid out of a boat or other device, or to use the inventive device as an air pump if desired.

If desired, a hose may be connected to the outlet 31, and hoses can be connected to the inlets 23 and 25. Of course, such hoses are an accessory and are optional and often unneeded. The invention may be made of any desired material including plastic, wood, metal or any combination of such materials.

One use of the present invention is to enable one to pump water out of the pontoons of a seaplane. In operating a seaplane, one required pre-flight procedure is to inspect the hollow compartments of the pontoons to ensure they are free from any water accumulation. Typically, such pontoons have as many as 12 separate compartments. As is known, any water that enters the compartments of these pontoons can adversely impact, not only buoyancy, but also the performance of the seaplane in flight due to accumulation of weight from the water. Additionally, accumulation of water in the pontoons in an uneven manner can impact the attitude of the seaplane in flight. The present invention may be used to pump water out of the compartments of seaplane pontoons either with or without adding one or more tubes to the inlets 23, 25. Applicant also notes that when a seaplane has landed and its engine is not operating, the inventive device 10 may be used to paddle the seaplane toward a dock or shoreline.

As a result of commercialization of the present invention, Applicant found that sand, grit, and/or other debris was able to bypass the check valve 37 during pumping operations and become located between the tubes 11 and 13 which resulted in binding between the tubes that prevented them from being able to telescope with respect to one another. As such, a second embodiment of the present invention has been devised which resolves this issue. In the second embodiment, the main difference from the first embodiment comprises the details of the housings and associated components employed to mount the two check valves in their mounted positions.

With reference first to FIGS. 8-11, a housing is generally designated by the reference numeral 50 and includes a first end 51 and a second end 53. A passageway 55 extends from the first end 51 to the second end 53 and allows flow of fluid therethrough.

The housing 50 has a first reduced diameter land 57 and a second reduced diameter land 59 for purposes to be described in greater detail hereinafter.

Figure 10:
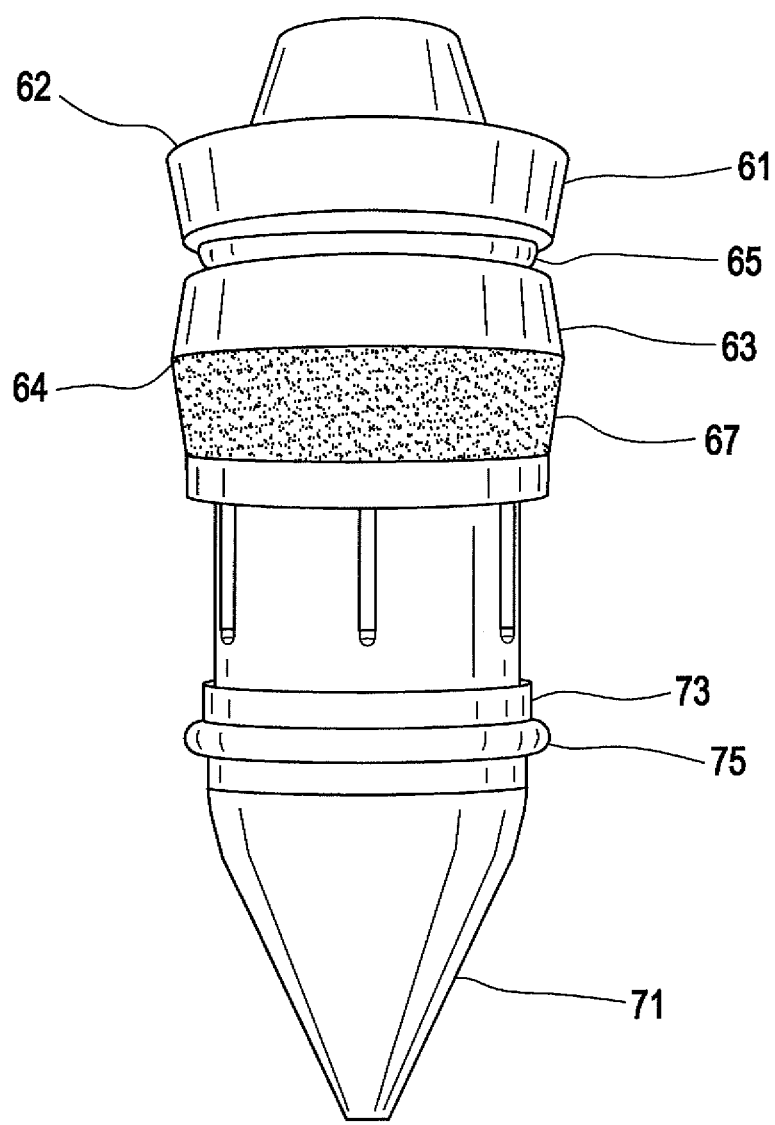
FIG. 10 shows a side view of the housing described in FIGS. 8 and 9 with all components assembled thereto.

With reference to FIG. 10, a series of components are mounted overlying the first land 57. These components comprise a seal assembly including a first truncated conical seal 61, a second truncated conical seal 63, an O-ring 65 between the seals 61 and 63, and a further cylindrical seal 67. Preferably, the reduced diameter ends of the seals 61 and 63 face one another as shown in FIG. 10. The seals 61 and 63 are preferably made of buna-n, a nitrile rubber product having a Durometer in the range of 60-80 on the Shore A hardness scale. The seal 67 is preferably made of a wool felt having an F3 hardness.

The seal 61 has a sealing edge 62 at its widest diameter and the seal 63 has a sealing edge 64 at its widest diameter. These sealing edges correspond in diameter to the diameter of the seal 67.

The second land 59 is adjacent a shoulder 69. As shown in FIG. 10, a check valve 71 is mounted on the housing 50 with the end 73 of the check valve 71 overlying the land 59 and an O-ring 75 holding the end 73 of the check valve 71 within the land 59. The O-ring 75 is stretched to locate it over the land 59 and when relaxed squeezes toward the land 59 to enhance retention of the check valve 71 on the housing 50.

Figure 11:
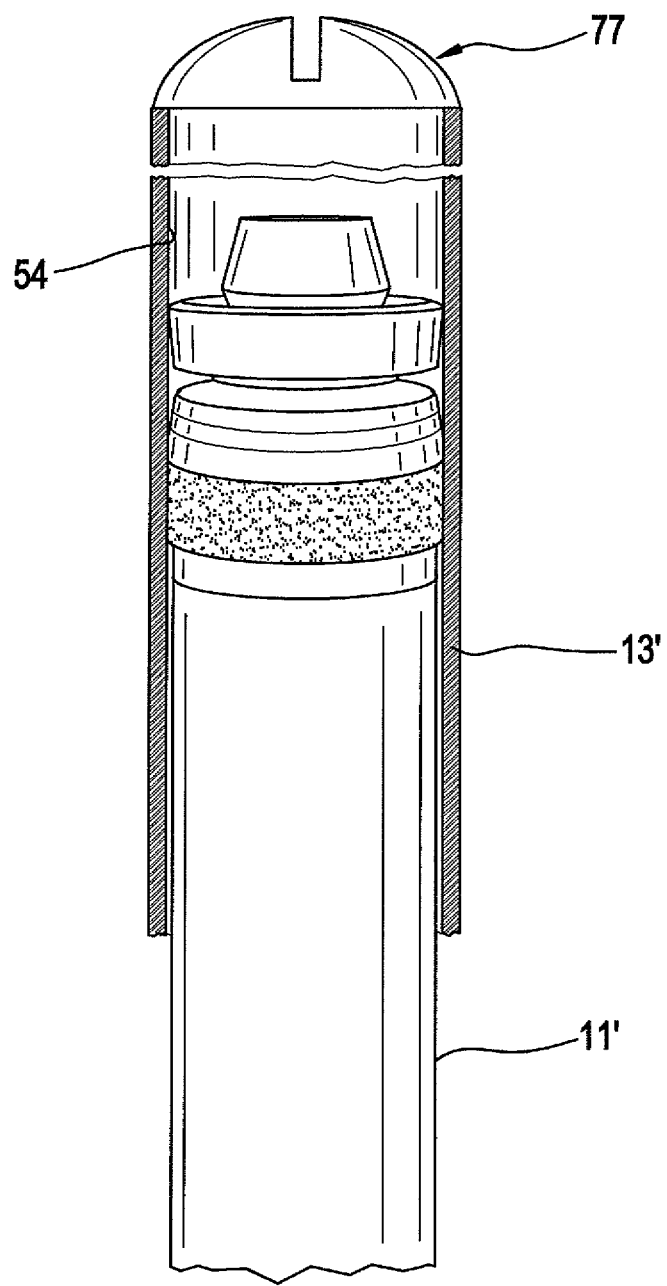
FIG. 11 shows a portion of the first hollow tube with the housing and its components attached thereto and telescoping within the second hollow tube.

With reference to FIG. 11, with like components from the first embodiment referenced using like primed reference numerals, the tube 11' carries the housing 50 with the components 61, 63, 65 and 67 mounted thereto along with the check valve 71 and O-ring 75 not visible in FIG. 11. The tube 11' telescopes within the tube 13'. The tube 13' has an intake housing 77 described in greater detail with reference to FIGS. 12-14. In FIG. 11, details of the housing 77 are omitted for ease of understanding.

Figure 9:
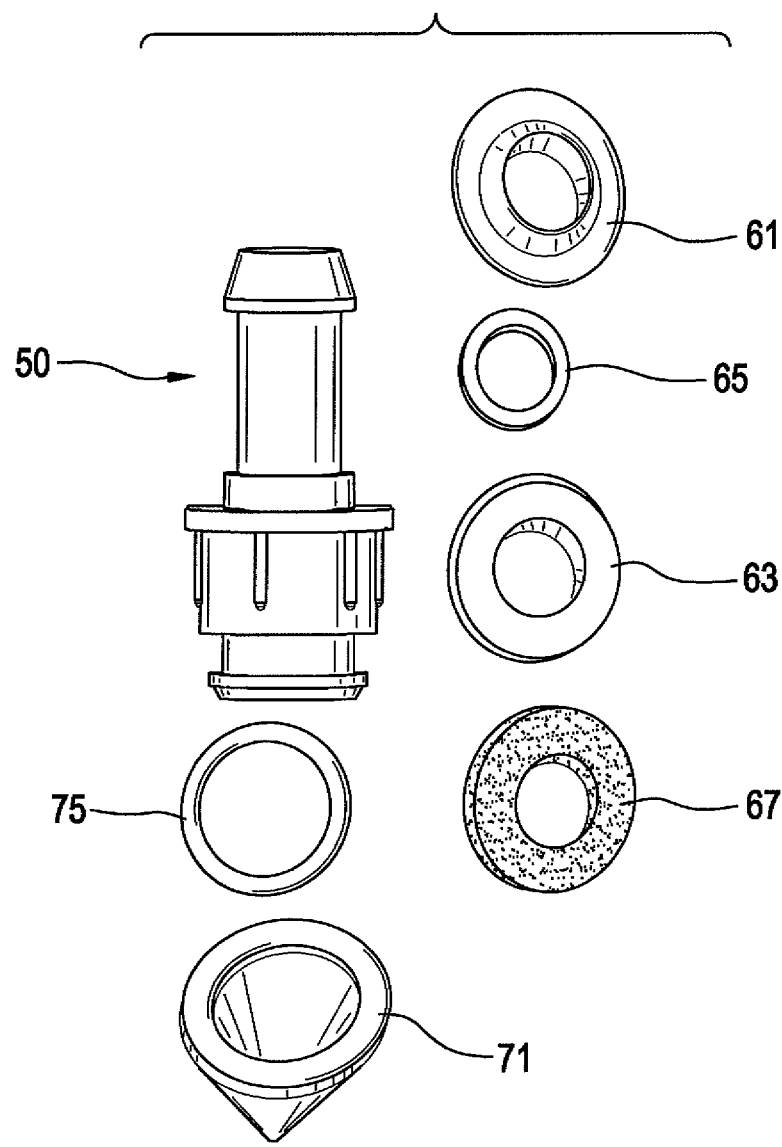
FIG. 9 shows an exploded view of all of the components assembled to the housing described in FIG. 8.

FIG. 9 shows the housing 50 and all the components assembled thereto in an exploded view. Those components include the seals 61, 63 and 67, the O-rings 65 and 75, and the check valve 71. As should be understood from FIG. 9, the seals 61, 63 and 67 have passageways therethrough to allow them to be mounted over the land 57.

Figure 12:
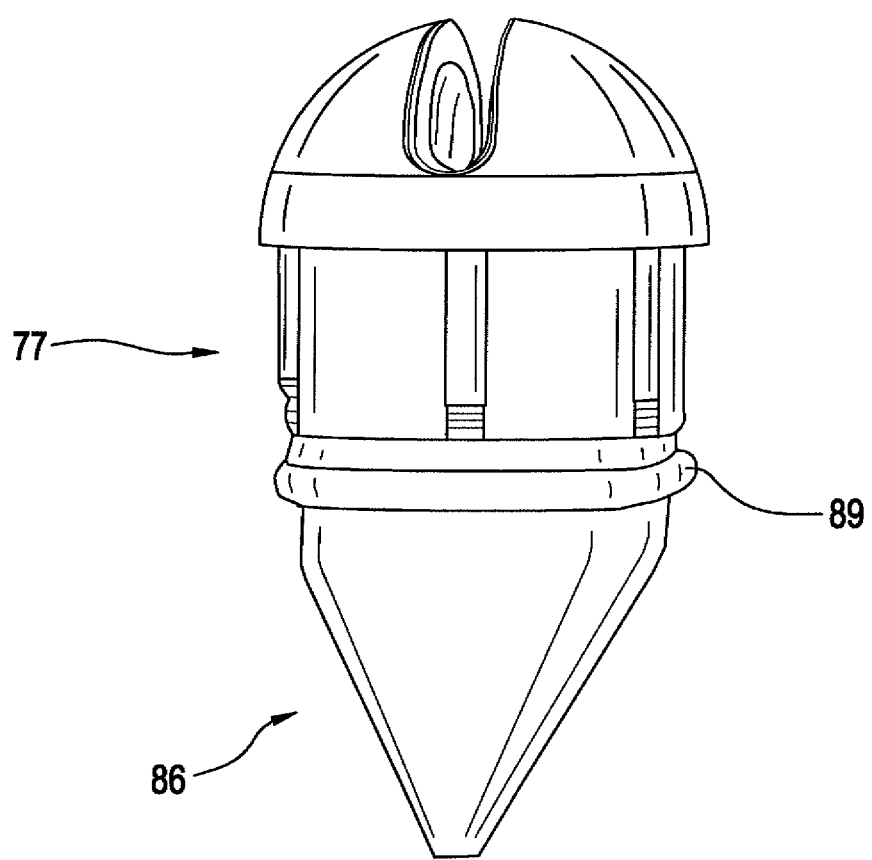
FIG. 12 shows a side view of a second housing including the fluid inlet and second check valve, which are assembled at the distal end of the second hollow tube.
Figure 13:
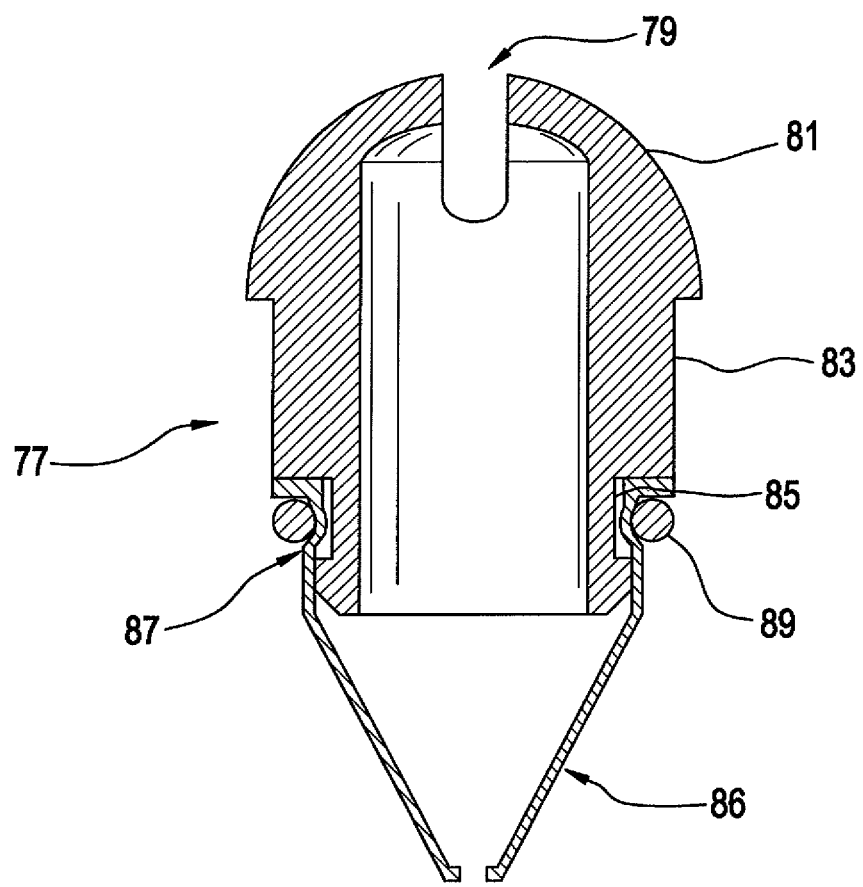
FIG. 13 shows a cross-sectional view of the assembly of FIG. 12.
Figure 14:
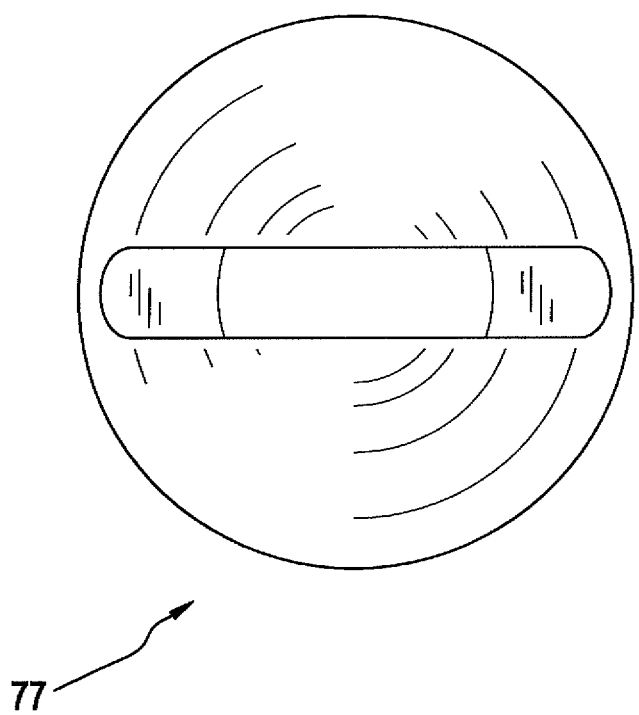
FIG. 14 shows an end view of the assembly of FIGS. 12 and 13 showing the intake slot.

Now, with reference to FIGS. 12-14, the intake housing 77 has an intake 79, a part spherical surface 81, a reduced diameter land 83, and a further reduced diameter land 85. The land 83 is sized to be received within the distal end of the tube 13' to assemble the housing 77 to the tube 13'. The intake 79 as best seen in FIG. 14 consists of an elongated slot. This intake slot 79 replaces the inlets 23 and 25 seen in FIG. 1.

As particularly shown in FIG. 13, the further reduced diameter land 85 receives an end 87 of check valve 86. An O-ring 89 holds the end 87 of the check valve 86 within the land 85 as shown. In this regard, the O-ring 89 is stretched and then placed over the end 87 of the check valve 86. When the O-ring 89 is relaxed, it squeezes toward the land 85 as shown to enhance retention of the check valve 86 on the housing 77. FIG. 12 shows the entire assembled housing 77, check valve 86, and O-ring 89.

Also, if desired, the inventive device 10 in either embodiment may be used as an air inflation pump suitable for use in inflating a pool float, a vehicle tire, an athletic ball, or any other device that is intended to operate when filled with air under pressure.

The operation of the second embodiment of the present invention is the same as in the first embodiment including the provision of a nut like the nut 40 with its associated components that may be loosened to allow the tubes 11' and 13' to be reciprocated with respect to one another with the tube 11' telescoping within the tube 13' to permit the pumping of liquid or air. The nut may be tightened to fix the orientation of the tube 11' with respect to the tube 13' at any desired total length to facilitate using the device as a paddle. The seals 61, 63 and 67 effectively seal the inner wall 54 (FIG. 11) of the tube 13' to preclude any sand, grit or other debris from bypassing the housing 52 and lodging between the tubes 11' and 13' which could bind up the tubes and prevent them from reciprocating.

As such, an invention has been disclosed in terms of preferred embodiments thereof which fulfill each and every one of the objects of the invention as set forth hereinabove, and provide a new and useful improved combination paddle and pump of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A combination paddle and pump, comprising:
   a) a first tube and a second tube, said first tube telescoping within said second tube between a contracted configuration and an extended configuration with said first tube having an outer wall sliding along an inner wall of said second tube;
   b) said first tube including a first distal inlet fluidly connected to a first internal passageway in said first tube via a first check valve;
   c) said second tube having a second distal inlet connected to a second internal passageway fluidly connected with said first internal passageway via a second check valve and said first check valve;
   d) a proximal end of said first internal passageway including an outlet;
   e) a paddle attached to said second tube;
   f) whereby said combination paddle and pump may be used as a paddle by gripping one of said tubes and stroking said tubes in a body of liquid; and
   g) whereby said combination paddle and pump may be used as a pump by dipping said second distal inlet within a volume of liquid or exposing said second distal inlet to atmospheric air and reciprocating said first tube with respect to said second tube to pump said liquid or air through said outlet, reciprocating said first tube away from said second tube causing fluid to enter said second distal inlet, pass through said second check valve and enter said second internal passageway, and reciprocating said first tube toward said second tube causing fluid in said second internal passageway to flow toward said first check valve, pass through said first check valve and enter said first internal passageway, consecutive reciprocations of said second tube causing fluid to exit said outlet; and
   h) said first check valve mounted on a housing attached to said first tube, said housing carrying a seal assembly wiping against said inner wall of said second tube to seal against debris around said housing and between said inner wall of said second tube and outer wall of said first tube proximal of said housing.

2. The combination paddle and pump of claim 1, wherein said outlet is located within a handle mounted on said proximal end of said second tube.

3. The combination paddle and pump of claim 2, wherein said handle is T-shaped.

4. The combination paddle and pump of claim 1, further including an adjustable nut that may be adjusted to lock an extent by which said first tube has reciprocated with respect to said second tube.

5. The combination paddle and pump of claim 4, wherein said adjusted nut has internal threads enmeshed with external threads on an external wall of the proximal end of said first tube.

6. The combination paddle and pump of claim 5, wherein a split ring is within said adjusted nut and a split of said split ring narrows as said adjusted nut is rotated to lock against said second tube.

7. The combination paddle and pump of claim 1, wherein said check valves are duckbill check valves.

8. The combination paddle and pump of claim 1, wherein said paddle includes a plurality of rings receiving said first tube.

9. The combination paddle and pump of claim 1, made of plastic.

10. The combination paddle and pump of claim 1, wherein said seal assembly includes at least one frustoconical seal.

11. The combination paddle and pump of claim 10, wherein said seal assembly includes at least one cylindrical seal.

12. The combination paddle and pump of claim 11, wherein said cylindrical seal is made of wool felt.

13. The combination paddle and pump of claim 12, wherein said at least one frustoconical seal comprises two frustoconical seals having reduced diameter ends facing one another.

14. The combination paddle and pump of claim 8, wherein said handle is T-shaped.

15. A combination paddle and pump, comprising:
   a) a first tube and a second tube, said first tube telescoping within said second tube between a contracted configuration and an extended configuration;
   b) said first tube including a first distal inlet fluidly connected to a first internal passageway in said first tube via a first check valve;
   c) said second tube having a second distal inlet and including a second internal passageway fluidly connected at a proximal end thereof with said first distal inlet of said first internal passageway via a second check valve and said first check valve;
   d) a proximal end of said first internal passageway including an outlet;
   e) a paddle attached to said second tube;
   f) whereby said combination paddle and pump may be used as a paddle by gripping said tubes and stroking said tubes in a body of liquid; and
   g) whereby said combination paddle and pump may be used as a pump by dipping said second distal inlet within a volume of liquid or exposing said second distal inlet to atmospheric air and reciprocating said first tube with respect to said second tube to pump said liquid or air through said outlet by reciprocating said first tube away from said second tube causing fluid to enter said second distal inlet and said second internal passageway via said second check valve, and reciprocating said first tube toward said second tube causing fluid in said second internal passageway to flow toward said first check valve, pass through said first check valve and enter said first internal passageway, consecutive reciprocations of said first tube within said second tube causing fluid to exit said outlet; and
   h) said first check valve mounted on a housing attached to said first tube, said housing carrying a seal assembly wiping against said inner wall of said second tube to seal against debris around said housing and between said inner wall of said second tube and outer wall of said first tube proximal of said housing.

16. The combination paddle and pump of claim 15, wherein said outlet is located within a T-shaped handle mounted on said proximal end of said first tube.

17. The combination paddle and pump of claim 16, further including an adjustable nut that may be adjusted to lock an extent by which said second tube has reciprocated with respect to said first tube.

18. The combination paddle and pump of claim 17, wherein said adjustable nut has internal threads enmeshed with external threads on an external wall of the proximal end of said first tube and wherein a split ring is within said adjustable nut and a split of said split ring narrows as said adjustable nut is rotated to lock against said second tube.

19. The combination paddle and pump of claim 15, wherein said check valves are duckbill check valves.

20. The combination paddle and pump of claim 15, wherein said seal assembly includes two frustoconical seals and a cylindrical seal, said frustoconical seals having reduced diameter ends facing one another.

* * * * *